(12) United States Patent
Peoples

(10) Patent No.: US 8,911,142 B1
(45) Date of Patent: Dec. 16, 2014

(54) BOWL AND SPATULA ASSEMBLY

(76) Inventor: Tyler J. Peoples, Colorado Springs, CO (US)

( * ) Notice: Subject to any disclaimer, the term of this patent is extended or adjusted under 35 U.S.C. 154(b) by 0 days.

(21) Appl. No.: 13/365,249

(22) Filed: Feb. 2, 2012

(51) Int. Cl.
*A47J 43/07* (2006.01)
*A47J 43/28* (2006.01)

(52) U.S. Cl.
USPC ........... 366/311; 366/276; 366/309; 220/695; 220/697; 220/698; 220/700; 220/701; 425/285

(58) Field of Classification Search
CPC .............................. B02F 7/00208; B02F 7/165
USPC .......... 220/695–697, 700–701; 366/276, 309, 366/311, 325.94; 425/285
See application file for complete search history.

(56) References Cited

U.S. PATENT DOCUMENTS

| | | | | |
|---|---|---|---|---|
| 57,051 A | * | 8/1866 | Wade | 366/302 |
| 80,440 A | * | 7/1868 | Blake | 366/276 |
| 88,612 A | * | 4/1869 | Crittenden | 366/276 |
| 690,254 A | * | 12/1901 | Enzler | 366/279 |
| 3,894,650 A | * | 7/1975 | Crump | 220/701 |
| D263,932 S | * | 4/1982 | Daenen et al. | D9/434 |
| D313,148 S | | 12/1990 | de Winter | |
| 5,169,023 A | | 12/1992 | Heiberg et al. | |
| 5,419,454 A | | 5/1995 | Stowell et al. | |
| 5,423,452 A | | 6/1995 | Tardif | |
| 5,549,216 A | * | 8/1996 | Scholl | 220/695 |
| 5,626,258 A | * | 5/1997 | Maiorino | 220/695 |
| D402,159 S | | 12/1998 | Laib | |
| D473,752 S | | 4/2003 | Kerr | |
| 6,616,110 B1 | * | 9/2003 | McIntee | 248/213.2 |
| 6,895,672 B2 | | 5/2005 | Conforti | |
| D545,629 S | | 7/2007 | Mellen et al. | |
| 2004/0120218 A1 | | 6/2004 | Donthnier et al. | |
| 2007/0286017 A1 | * | 12/2007 | Wong | 366/279 |
| 2010/0012639 A1 | * | 1/2010 | Merrell et al. | 219/201 |
| 2011/0178372 A1 | * | 7/2011 | Pacey et al. | 600/188 |

\* cited by examiner

*Primary Examiner* — David Sorkin
*Assistant Examiner* — Abbas Rashid

(57) ABSTRACT

A bowl and spatula assembly provides an integrated spatula to scrape a mixture efficiently from a mixing bowl. The assembly includes a bowl having a bottom and a perimeter wall extending upwardly from the bottom. An arcuate spatula has opposite ends pivotally coupled to the bowl. The spatula also has an outer perimeter edge abutting an inner surface of the bowl whereby the spatula is configured for scraping a substance out of the bowl when the spatula is pivoted.

7 Claims, 3 Drawing Sheets

BOWL AND SPATULA ASSEMBLY

BACKGROUND OF THE DISCLOSURE

Field of the Disclosure

The disclosure relates to mixing bowl devices and more particularly pertains to a new mixing bowl device for providing an integrated spatula to scrape a mixture efficiently from the mixing bowl.

SUMMARY OF THE DISCLOSURE

An embodiment of the disclosure meets the needs presented above by generally comprising a bowl having a bottom and a perimeter wall extending upwardly from the bottom. An arcuate spatula has opposite ends pivotally coupled to the bowl. The spatula also has an outer perimeter edge abutting an inner surface of the bowl whereby the spatula is configured for scraping a substance out of the bowl when the spatula is pivoted.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
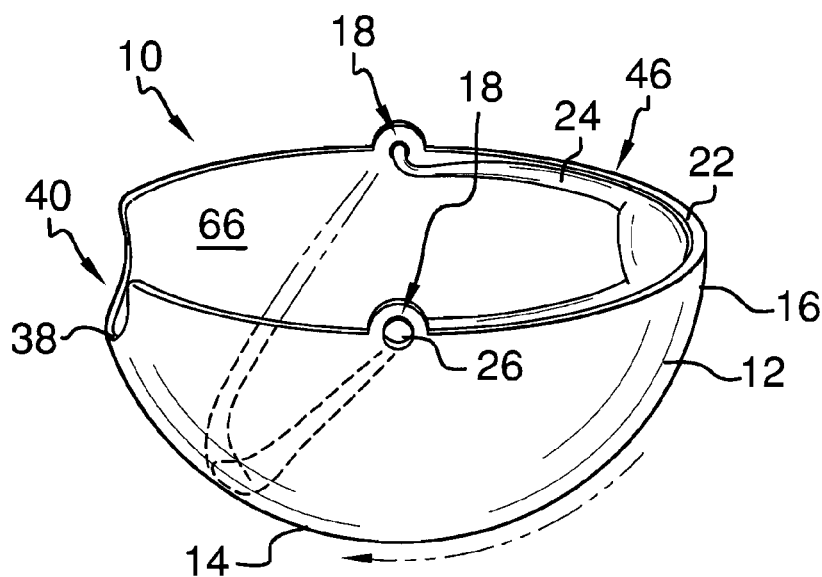
FIG. 1 is a top side perspective view of a bowl and spatula assembly according to an embodiment of the disclosure.
Figure 2:
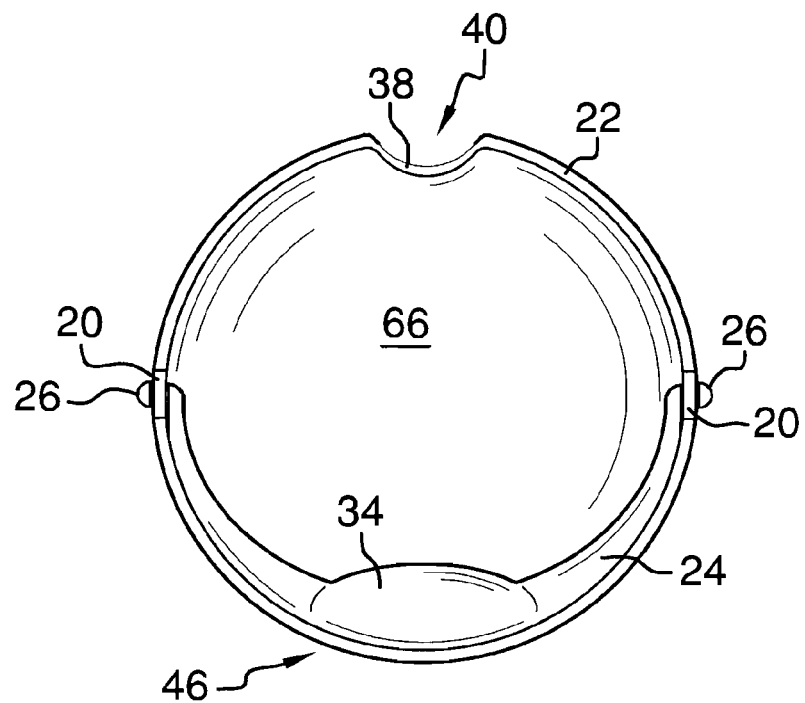
FIG. 2 is a top view of an embodiment of the disclosure.
Figure 3:
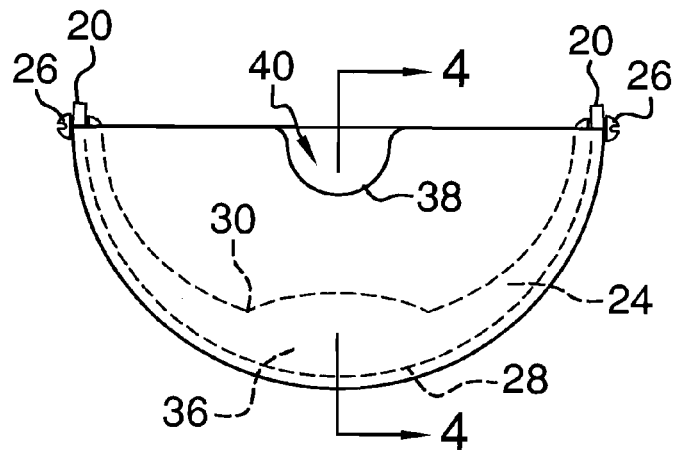
FIG. 3 is a front view of an embodiment of the disclosure.
Figure 4:
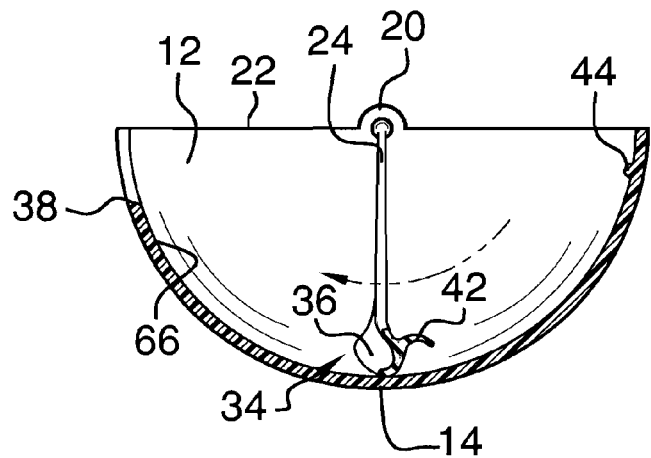
FIG. 4 is a cross-sectional view of an embodiment of the disclosure taken along line 4-4 of FIG. 3.
Figure 5:
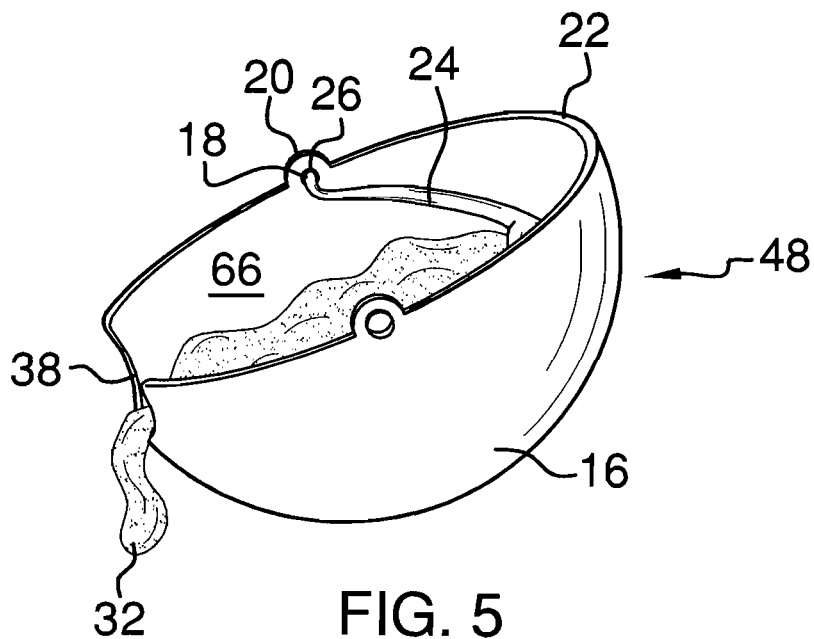
FIG. 5 is a top front side perspective view of an embodiment of the disclosure in use.
Figure 6:
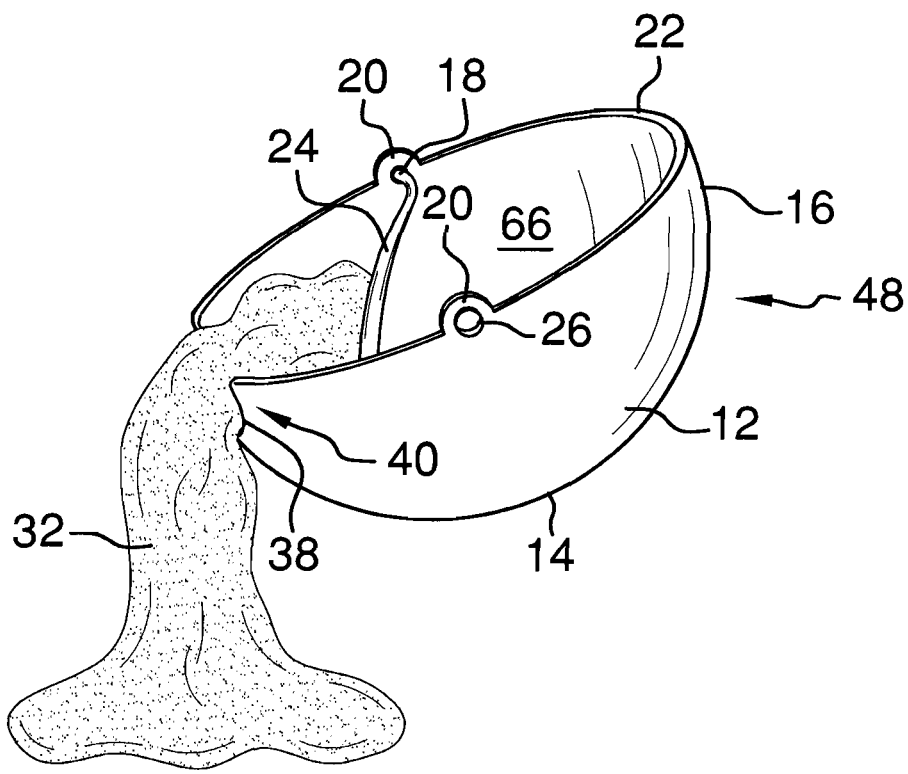
FIG. 6 is a top front side perspective view of an embodiment of the disclosure in use.

With reference now to the drawings, and in particular to FIGS. 1 through 6 thereof, a new mixing bowl device embodying the principles and concepts of an embodiment of the disclosure and generally designated by the reference numeral 10 will be described.

As best illustrated in FIGS. 1 through 6, the bowl and spatula assembly 10 generally comprises a bowl 12 having a bottom 14 and a perimeter wall 16 extending upwardly from the bottom 14. The bowl 12 has a pair of opposed apertures 18. The apertures 18 may be positioned in tabs 20 extending upwardly from a top edge 22 of the perimeter wall 16 of the bowl 12. An arcuate spatula 24 has opposite ends 26 pivotally coupled to the bowl 12. The opposite ends 26 of the spatula 24 are inserted through the opposed apertures 18. The opposite ends 26 may be collinearly aligned.

The spatula 24 has an outer perimeter edge 28 and an inner perimeter edge 30. The outer perimeter edge 28 abuts an inner surface 66 of the bowl 12 whereby the spatula 24 is configured for scraping a substance 32 out of the bowl 12 when the spatula 24 is pivoted. A medial portion 34 of the spatula 24 has a concave side 36. A protrusion 42 extends from the spatula 24 and is configured for being grasped to facilitate pivoting the spatula 24. The spatula 24 may be constructed of a resilient material to facilitate the outer perimeter edge 28 abutting the inner surface 66 of the bowl 12.

The top edge 22 of the perimeter wall 16 includes a downwardly extending lip 38 defining an opening 40 in the perimeter wall 16. The opening 40 is configured for facilitating pouring the substance 32 from the bowl 12. A notch 44 extends outwardly from the inner surface 66 of the bowl 12 across from the opening 40. The notch 44 is positioned to engage the outer perimeter edge 28 to support the spatula 24 in a raised position 46 over the bottom 14 of the bowl 12. The notch 44 is positioned in spaced relationship to the top edge 22 of the perimeter wall 16 whereby the spatula 24 is positioned proximate the top edge 22 when the spatula 24 is in the raised position 46. The spatula 24 being constructed of resilient material permits pushing of the spatula 24 downwardly to pass over the notch 44.

In use, the substance 32 may be mixed in the bowl 12 as desired. When a user wishes to remove the substance 32 from the bowl 12, the bowl 12 may be held in a tilted position 48 such that gravity urges the substance 32 towards the opening 40. The spatula 24 may be pivoted towards the opening 40 whereby the outer perimeter edge 28 scrapes against the inner surface 66 of the bowl 12 facilitating efficient and full pouring of the substance 32 out of the bowl 12 through the opening 40.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A bowl and spatula assembly comprising:
   a bowl having a bottom and a perimeter wall extending upwardly from said bottom;
   a top edge of said perimeter wall having a downwardly extending lip defining an opening in said perimeter wall, said opening being U-shaped and configured for facilitating pouring a substance out from the bowl;
   an arcuate spatula having opposite ends pivotally coupled to said bowl, said spatula having an outer perimeter edge and an inner perimeter edge, said outer perimeter edge abutting an inner surface of said perimeter wall of said bowl whereby said spatula is configured for scraping a substance out of said bowl when said spatula is pivoted; and
   a notch extending inwardly into said bowl from said inner surface of said perimeter wall of said bowl, said notch being positioned to support said spatula in a raised position within said bowl over said bottom of said bowl, said notch being positioned in downwardly spaced relationship to said top edge of said perimeter wall whereby said spatula is positioned proximate said top edge when said spatula is in said raised position.

2. The assembly of claim 1, further comprising:

said bowl having a pair of opposed apertures; and said opposite ends of said spatula being inserted through said opposed apertures.

3. The assembly of claim 1, further including a medial portion of said spatula having a concave side.

4. The assembly of claim 3, further including said medial portion of said spatula being aligned with said opening whereby said medial portion of said spatula passes over said opening as said spatula pivots.

5. The assembly of claim 3, further including a protrusion extending from said spatula, said protrusion being configured for being grasped to facilitate pivoting said spatula.

6. The assembly of claim 1, further including said spatula being constructed of a resilient material.

7. A bowl and spatula assembly comprising:

a bowl having a bottom and a perimeter wall extending upwardly from said bottom, said bowl having a pair of opposed apertures;

an arcuate spatula having opposite ends pivotally coupled to said bowl, said opposite ends of said spatula being inserted through said opposed apertures, said spatula having an outer perimeter edge and an inner perimeter edge, said outer perimeter edge abutting an inner surface of said perimeter wall of said bowl whereby said spatula is configured for scraping a substance out of said bowl when said spatula is pivoted, a medial portion of said spatula having a concave side, said spatula being constructed of a resilient material;

a top edge of said perimeter wall having a downwardly extending lip defining an opening in said perimeter wall, said opening being U-shaped and configured for facilitating pouring the substance from the bowl;

a medial portion of said spatula having a concave side, said medial portion of said spatula being aligned with said opening whereby said medial portion of said spatula passes over said opening as said spatula pivots;

a protrusion extending from said spatula, said protrusion being configured for being grasped to facilitate pivoting said spatula; and a notch extending inwardly into said bowl from said inner surface of said perimeter wall of said bowl, said notch being positioned to support said spatula in a raised position within said bowl over said bottom of said bowl, said notch being positioned in downwardly spaced relationship to said top edge of said perimeter wall whereby said spatula is positioned proximate said top edge when said spatula is in said raised position.

* * * * *